UNITED STATES PATENT OFFICE.

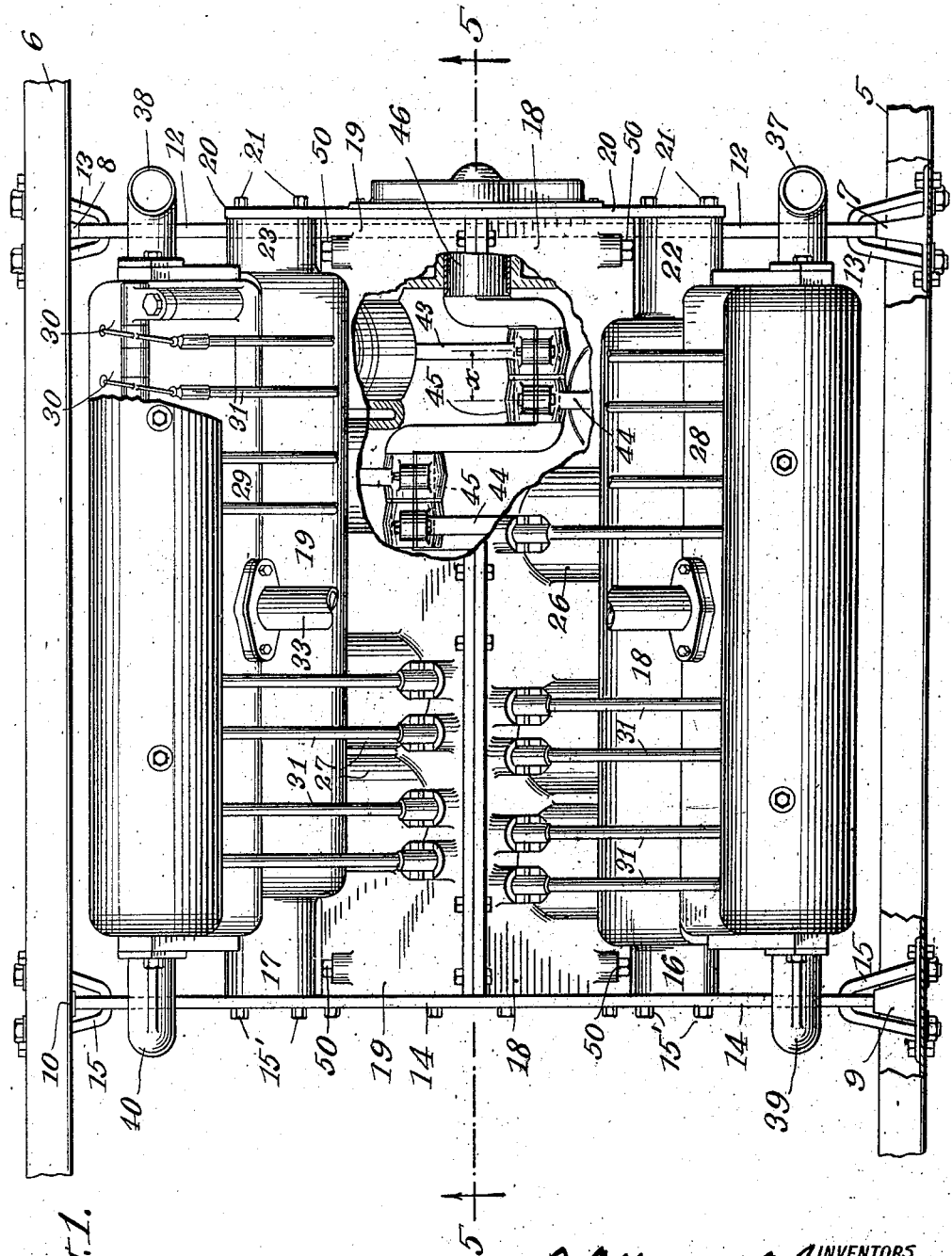

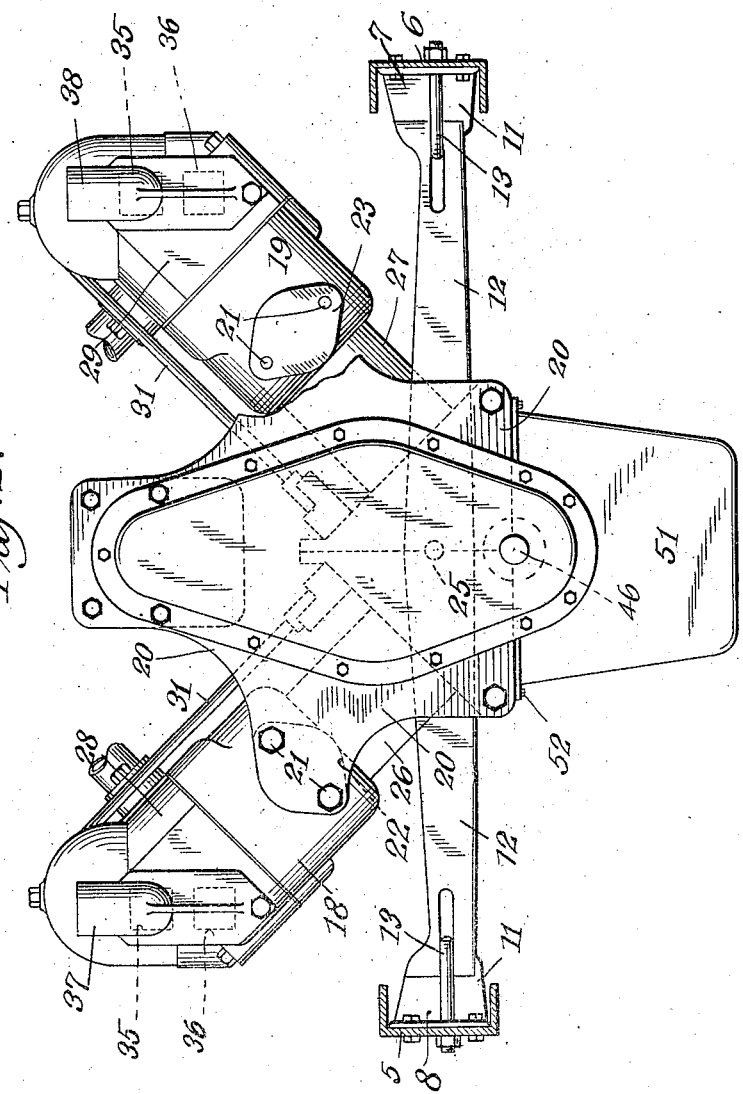

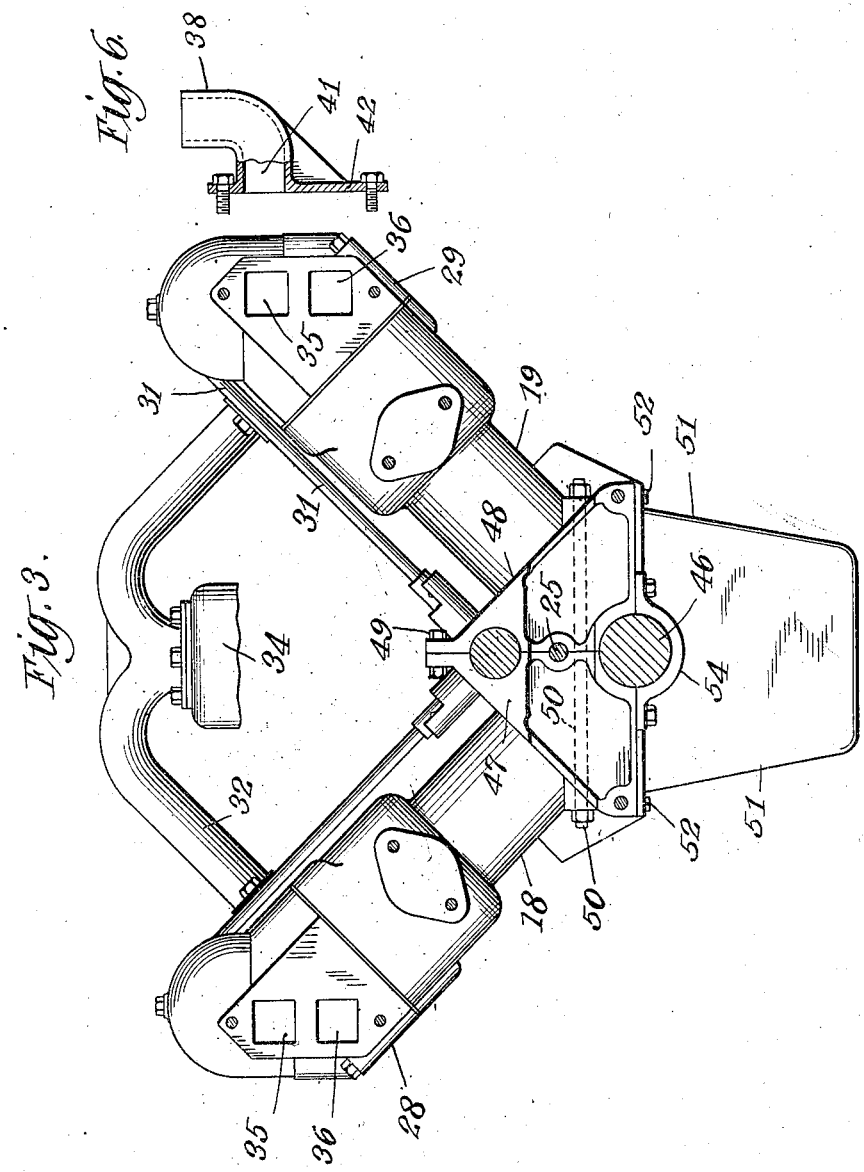

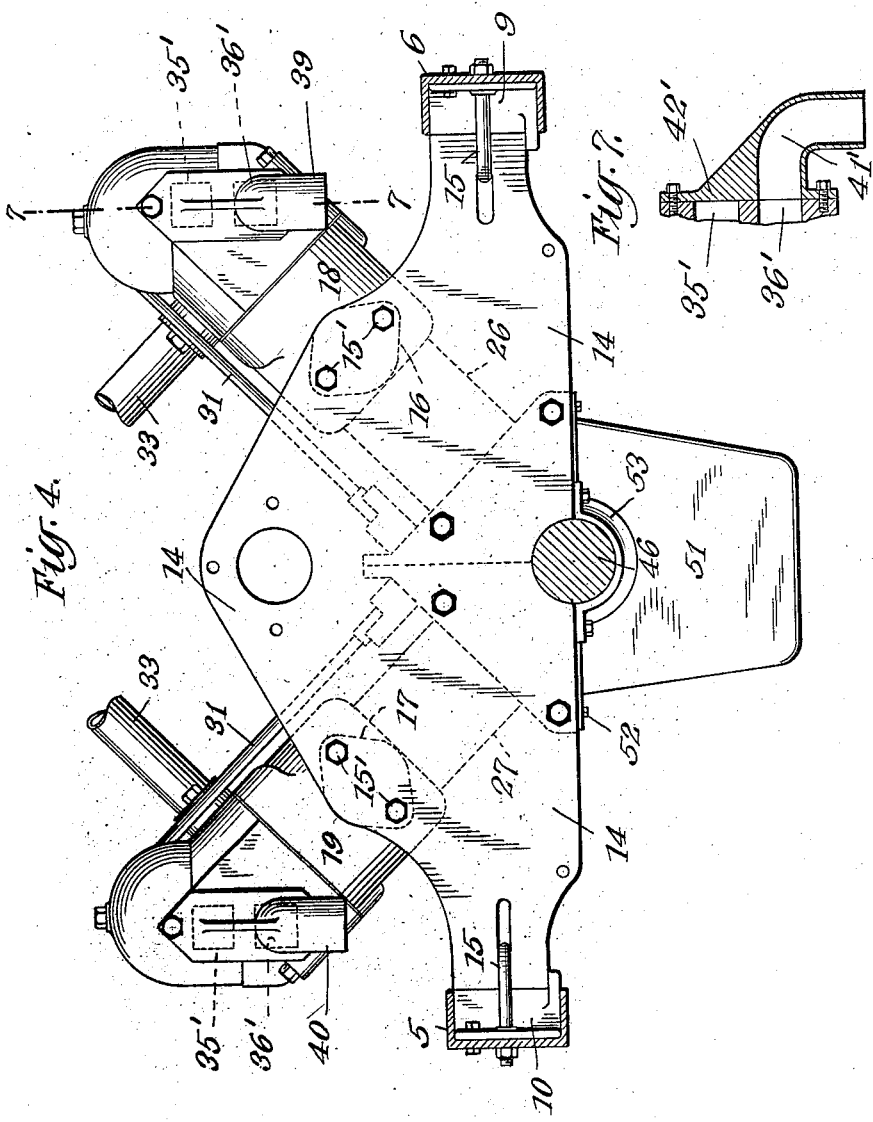

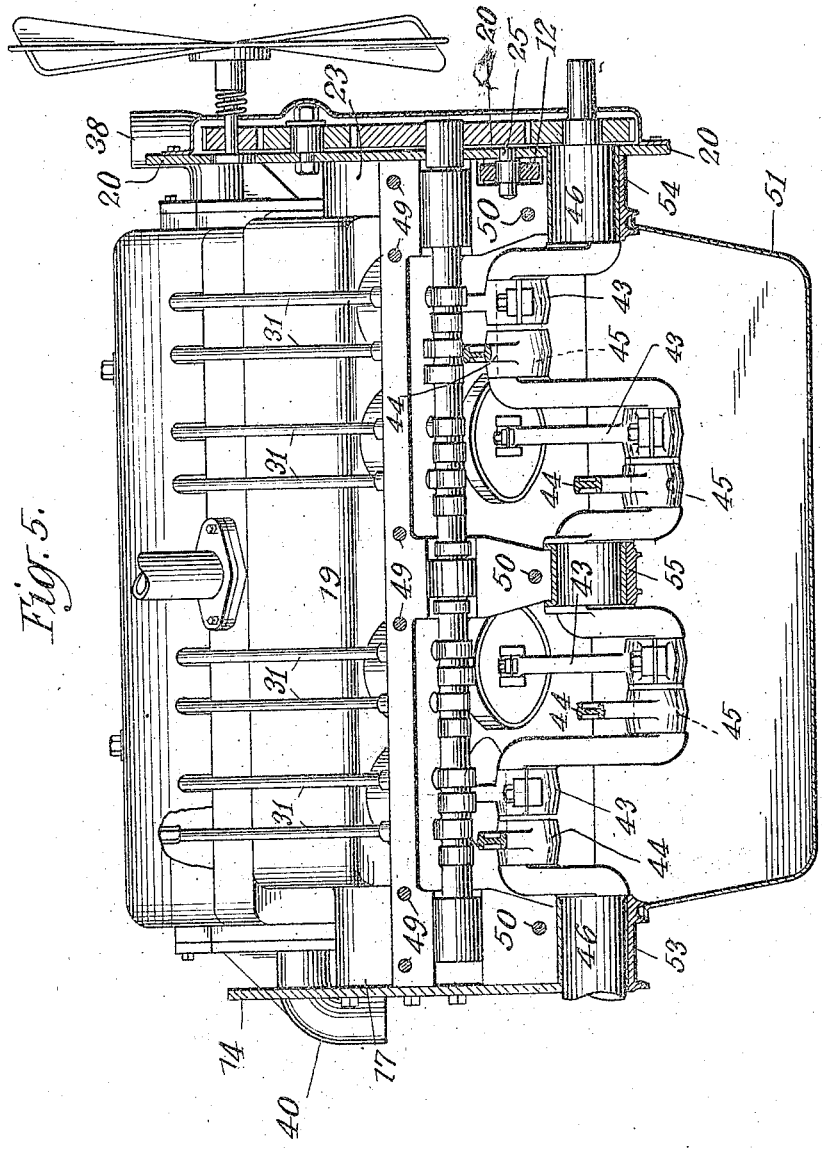

ARTHUR C. MASON AND ALFRED T. STURT, OF FLINT, MICHIGAN, ASSIGNORS TO CHEVROLET MOTOR COMPANY, OF NEW YORK, N. Y., A CORPORATION OF DELAWARE.

AUTOMOBILE-ENGINE.

1,276,389.   Specification of Letters Patent.   Patented Aug. 20, 1918.

Application filed June 12, 1916. Serial No. 103,109.

*To all whom it may concern:*

Be it known that we, ARTHUR C. MASON and ALFRED T. STURT, citizens of the United States, and residents of the city of Flint, county of Genesee, State of Michigan, have jointly invented certain new and useful Improvements in Automobile-Engines, of which the following is a specification.

This invention relates to improvements in the constructive features of automobile engines of a V-type and has for one of its objects the economical production of an efficient power unit. Another object is to provide a V-type of engine, in which the castings forming one-half thereof are duplicates, respectively, of those forming the other half; that is to say, the two cylinder blocks are duplicates and the two cylinder heads are also duplicates. Another object is to provide an engine of such design and construction that it may be readily supported by transverse supporting members secured to the frame or chassis of an automobile as more particularly set forth in our application executed of even date herewith.

Referring to the drawings which form part of this application, in which similar characters of reference indicate the same parts in the several views:

Figure 1 is a top plan view with portions broken away showing a V-type of engine, and the means for supporting the same upon the chassis.

Fig. 2 is a front elevation of the mechanism shown in Fig. 1, the chassis being shown in section.

Fig. 3 is a front elevation of the engine removed from the supporting elements, portions being broken away and the crank shaft shown in section.

Fig. 4 is a rear elevation of the mechanism shown in Fig. 1, the chassis being shown in section.

Fig. 5 is a longitudinal section on line 5—5 of Fig. 1.

Fig. 6 is a detail view of the water jacket connection partly in section and partly in elevation.

Fig. 7 is a fragmentary view in section on line 7—7 of Fig. 4.

We will first describe in general the structure by means of which the engine, which is the subject-matter of the present invention, is preferably secured to the chassis.

Brackets 7, 8, 9 and 10 are detachably secured to the side channel beams 5 and 6 of the chassis and each of these brackets is provided with an extension lug 11 to form a seat for the supporting members hereinafter described.

The front supporting member 12 is securely held in place on the brackets 7 and 8 by suitable U-bolts 13, and similarly, the rear supporting member 14 is secured to the brackets 9 and 10 by the U-bolts 15. The supporting members 12 and 14 are preferably made of flat sheet metal punchings and thus form an extremely convenient means of support for an engine of the type embodying our invention which is formed by securing together duplicate castings, as will be more particularly hereinafter described.

The engine is secured directly to the rear supporting plate by bolts 15' which enter integral lugs 16 and 17 projecting from the rear of the cylinder blocks 18 and 19. An intermediate plate 20 is secured to the front of the engine by bolts 21 which enter integral lugs 22 and 23 projecting from the front of the cylinder blocks 18 and 19. A pin 25 passes through the plates 12 and 20 and is secured in place in the engine, as shown in Figs. 2 and 3, in order to provide for a pivotal support for the engine at that point.

It will thus be seen that the engine is supported on the chassis by the plates 14, 20 and 12, the plates 20 and 12 being connected by the pivot pin 25, and the plates 14 and 12 being removably secured to the channel beams 5 and 6 of the chassis.

We will now proceed to particularly describe the structure of engine embodying the subject-matter of the present invention. The engine is of the V-type and is formed by holding together at the longitudinal medial line, duplicate castings forming the cylinder blocks 18 and 19, in each of which is provided a plurality of cylinders 26 and 27. The cylinder heads 28 and 29 are likewise duplicates and are secured by bolts, or in any suitable manner, to the cylinder castings or blocks 18 and 19.

The cylinder heads 28 and 29 are provided with any suitable overhead inlet and exhaust valve ports and valve seats (not shown). The valves co-act with said valve seats, being operated by suitable rocker arms 30 which are operated by push rods 31, the construction of which is more particularly described and claimed in my co-pending application referred to above. The inlet and exhaust ports for the respective manifolds are cored in the front and rear ends of the cylinder heads 28 and 29, the front ports being clearly shown at 35 and 36 in Fig. 3, and by dotted lines in Fig. 2. These ports are also indicated in dotted lines at 35′ and 36′ in Fig. 4.

The pipes 32 and 33 connect the inlet manifolds of both cylinder heads with a single carbureter 34 which serves for both manifolds. It will therefore be seen that at each end of each cylinder head two ports are located which communicate respectively with the water jacket and exhaust manifolds. At the front end of the cylinder heads 28 and 29 are secured water jacket fittings 37 and 38, and at the rear ends of said cylinder heads are secured exhaust fittings 39 and 40.

In view of the fact that the cylinder heads are duplicates and may be interchangeably used, it follows that the fittings 37 and 38, 39 and 40 are duplicates, and are so shaped and constructed that when turned end for end, the opening 41, as shown in Fig. 6, of the fittings 37 and 38 may be made to register with the ports 35. The fittings are so positioned at the front of the engine that the opening 41 is in register with the water jacket port 35, and the exhaust manifold port 36 is closed by the extension plate 42, while at the rear the fittings are positioned as shown in Fig. 7 so that the exhaust port 36′ will register with the opening 41′ of the fitting, and the portion 42′ of the fitting forms a closure for the port 35′ in the rear of the engine.

By means of the use of the cylinder heads and fittings as above described, it is obvious that duplicate cylinder head castings may be used on either the right or left half of the engine.

The cylinder castings or blocks 18 and 19 are likewise so designed and mounted that they too are duplicates and therefore interchangeable.

While the castings 18 and 19 are duplicates, the right casting when mounted to form part of the engine is not symmetrical with the left casting when so mounted. This fact will be readily seen from an examination of Fig. 1, where the length of the lug 17 of the casting 19 is greater than the length of the lug 23 of the same casting, and the length of the lug 23 of the casting 19 is the same as the length of the lug 16 of the casting 18, and similarly, the lugs 17 and 22 of the respective castings are of the same length.

The difference in length of the lug 22 and the lug 23 is equal to the longitudinal distance $x$ at the center in the portion broken away in Fig. 1, which is the distance between the centers of adjacent cylinders in the oppositely disposed castings 18 and 19. By having the cylinders of the castings 18 and 19 offset, as shown in Fig. 1, the connecting rods 43 and 44 of opposite cylinders are connected in pairs to the same crank pins, as at 45 of the crank shaft 46. This structure is clearly shown in Figs. 1 and 5, and of course, it is to be understood that the structure is the same for each pair of oppositely disposed cylinders.

The castings 18 and 19 are provided with portions 47 and 48 which form the upper half of the crank casing. The end bearings 53 and 54 and a central bearing 55 are secured to the portions 47 and 48 forming the upper half of the crank case. These bearings support the crank shaft centrally of the engine.

The castings 18 and 19 are secured together at the top of the joint by bolts 49, and at the bottom of the joint by bolts 50, as shown in Figs. 3 and 5. The lower half of the crank case 51 is formed of a sheet metal punching secured to the upper half of the crank case by screws or bolts 52.

From the foregoing description it will be seen that the V-type of engine embodied in our invention is built up of two half sections, each one of which is made from parts identical in shape and size.

This construction is very desirable from a manufacturing standpoint, as it is more economical to construct a great quantity of identical parts which may be used interchangeably than to make two or more sets of special parts which cannot be used interchangeably. A V-type engine made in two parts is also more easily handled in the course of manufacture than one that is cast integral, and the saving in cost is decidedly less viewed from every standpoint.

Our improved engine is so designed that all parts are readily accessible to inspection and repair, and is so supported on the chassis that the entire engine may be easily and quickly dismantled.

As many changes could be made in the above construction and many apparently widely different embodiments of our invention could be made without departing from the scope thereof, we intend that all matter contained in the above description or shown in the accompanying drawings shall be interpreted as illustrative and not in a limiting sense.

It is to be understood that the details of construction may be changed without departing from the spirit and scope of this invention.

Having now described our invention, what we claim as new and desire to secure by Letters Patent is:

1. A multi-cylinder engine of the V-type formed in sections, a chassis, means on the ends of each section for attaching that section to the chassis, the said attaching means at the ends of either section being of unequal length.

2. A multi-cylinder engine of the V-type formed in duplicate interchangeable sections, a chassis, means on the ends of each section for attaching that section to the chassis, the said attaching means at the ends of either section being of unequal length.

3. A multi-cylinder engine of the V-type formed in sections with the cylinders of each section opposed to one another in pairs and offset, and means carried by each of the multi-cylindered sections for determining the degree of offset of each pair of opposed cylinders.

4. A multi-cylinder engine of the V-type formed in duplicate interchangeable sections with the cylinders of each section opposed to one another in pairs and offset, and means carried by each of the multi-cylindered sections for determining the degree of offset of each pair of opposed cylinders.

5. In a multi-cylinder engine of the V-type formed in sections, with the cylinders of each section opposed to one another in pairs, with their centers in different transverse planes, a chassis means of unequal length at the ends of the sections for attaching the said sections to the chassis, the difference in length between the attaching means on the ends of any section being equal to the distance between the transverse planes passing through the centers of any pair of opposed cylinders of the sections.

6. In an automobile provided with channel beams, with transverse members connecting said beams, the combination of a V-type engine formed in sections, means on said sections for attaching the same to one of said transverse members, and for pivoting the said sections to the other of said transverse members.

7. In an automobile provided with channel beams and transverse members connecting said beams, the combination of a V-type engine formed in duplicate interchangeable sections, means on said sections for attaching the same to one of said transverse members and for pivoting said sections to the other of said transverse members.

8. The combination with the chassis of an automobile of a V-type engine formed of interchangeable sections with opposed cylinders of said sections offset and means carried by said sections for attaching the sections to the chassis and for determining the degree of offset of the cylinders.

9. The combination with the chassis of an automobile of a V-type engine formed of interchangeable sections, transverse members connecting the sections to the chassis, the said sections being rigidly connected to one of said transverse members and pivotally connected to the other of said transverse members.

10. The combination with the chassis of an automobile of a V-type engine formed of interchangeable sections, means for rigidly connecting the sections to the chassis at one end of the said sections and means on the other end of the sections for pivoting them to the chassis.

11. The combination with the chassis of an automobile, of a V-type engine formed of interchangeable sections, a transverse member at one end of the sections connecting the same to the chassis, a transverse member uniting the opposite ends of said sections and a pivot connecting said last named transverse member to the chassis.

12. The combination with the chassis of an automobile, brackets carried by the channel beams of said chassis, transverse members resting on said brackets, a V-type engine rigidly connected to one of said transverse members and pivotally connected to the other of said transverse members.

13. The combination with the chassis of an automobile, brackets carried by the channel beams of said chassis, transverse members resting on the brackets, a V-type engine formed in sections, means for connecting the sections at one end of the same to one of said transverse members, a plate connecting the sections at their opposite ends and a pivot connecting said plate with the other of said transverse members.

14. The combination with the chassis of an automobile, brackets carried by the channel beams of said chassis, transverse members resting on the brackets, a V-type engine formed of interchangeable sections, means for connecting the sections at one end of the same to one of said transverse members, a plate connecting the sections at their opposite ends and a pivot connecting said plate with the other of said transverse members.

15. The combination with the chassis of an automobile, of a multi-cylinder engine formed of complementary interchangeable sections, each section comprising a plurality of cylinders and a part of the crank case integrally cast, lugs of unequal length longitudinally carried at either end of each of the sections for attaching the said sections to the chassis.

16. The combination with the chassis of an automobile, of a multi-cylinder engine formed of complementary interchangeable sections, each section comprising a plurality of cylinders and a part of the crank case integrally cast, the said sections being united with opposed cylinders, offset means carried by the sections for attaching them to the chassis, the said attaching means being so disposed as to determine the degree of offset of the opposed cylinders.

17. In a multi-cylinder engine formed of complementary interchangeable sections, each section comprising a plurality of cylinders and a part of the crank case integrally cast, the crank case sections meeting in the central longitudinal vertical plane at an angle to the axes of the cylinders to form a V-type motor with opposed cylinders offset, the combination of a chassis, and means carried by the interchangeable sections for connecting the same to the chassis and for determining the degree of offset of the opposed cylinders.

18. In a V-type engine, a cylinder head provided with exhaust and water ports, and duplicate reversible fittings for said ports.

19. In a V-type engine, duplicate cylinder heads provided with symmetrically arranged inlet, exhaust and water ports, and duplicate reversible fittings for said inlet, exhaust and water ports.

20. A multi-cylinder engine formed of complementary interchangeable sections, each section comprising a plurality of cylinders and a part of the crank case integrally cast, the crank case sections meeting in the central vertical plane and being arranged at an angle to the axes of the cylinders to form a V-type motor.

21. A multi-cylinder engine of the V-type formed of duplicate interchangeable cylinder sections.

22. A multi-cylinder engine of the V-type formed of interchangeable cylinder sections.

23. A multi-cylinder engine of the V-type formed of interchangeable sections, each section comprising a plurality of cylinders and a part of the crank case integrally cast, the crank case sections meeting in a central vertical plane.

24. A multi-cylinder engine formed of interchangeable sections, each section comprising a plurality of cylinders with parallel axes, and a part of the crank case integral therewith, the crank case sections meeting in the central vertical plane of the engine, and being at an angle to the axes of the cylinders to form a V-type motor.

25. A multi-cylinder engine of the V-type comprising interchangeable sections, each section consisting of a plurality of cylinders, and a portion of the crank case cast en bloc, said crank case portions meeting in the central vertical plane of the engine and extending laterally from the engine cylinders upward into the V-space therebetween to increase the vertical dimension of the crank case, and a cam shaft located in said extension.

26. A gas engine of the V-type provided with duplicate interchangeable cylinder blocks.

27. A cylinder block for gas engines provided on its opposite ends with attaching means of unequal length.

28. A cylinder block for gas engines provided on its opposite ends with supporting lugs of unequal length.

In witness whereof we have hereunto set our hands at the borough of Manhattan, city and State of New York, this twenty-ninth day of May, 1916.

ARTHUR C. MASON.
ALFRED T. STURT.

In presence of—
ISABEL R. RICHARDS,
CORNELIUS C. BILLINGS.